US008648743B2

(12) United States Patent
Sierwald (10) Patent No.: US 8,648,743 B2
(45) Date of Patent: Feb. 11, 2014

(54) METHOD AND IMPLEMENTATION FOR CALCULATING SPEED DISTRIBUTIONS WITH MULTI-PRI AND SMPRF RADARS (71) Applicant: Eigenor Oy, Sodankyla (FI)

(72) Inventor: Jorn Sierwald, Kiel (DE)

(73) Assignee: Eigenor Oy, Sodankyla (FI)

( * ) Notice: Subject to any disclaimer, the term of this patent is extended or adjusted under 35 U.S.C. 154(b) by 0 days.

(21) Appl. No.: 13/688,528

(22) Filed: Nov. 29, 2012

(65) Prior Publication Data
US 2013/0154875 A1 Jun. 20, 2013

(30) Foreign Application Priority Data

Dec. 20, 2011 (FI) ...................................... 20116289

(51) Int. Cl.
*G01S 13/00* (2006.01)
(52) U.S. Cl.
USPC .......... 342/26 R; 342/26 D; 342/192; 342/195
(58) Field of Classification Search
USPC ..................... 342/26 R–26 D, 104, 112, 115
See application file for complete search history.

(56) References Cited

U.S. PATENT DOCUMENTS

| 5,093,662 | A | * | 3/1992 | Weber ........................... 342/26 D |
| 5,130,712 | A | * | 7/1992 | Rubin et al. ................. 342/26 D |
| 5,394,155 | A | * | 2/1995 | Rubin et al. ................. 342/192 |
| 5,442,359 | A |   | 8/1995 | Rubin |
| 6,448,923 | B1 | * | 9/2002 | Zrnic et al. .................. 342/26 R |
| 6,480,142 | B1 | * | 11/2002 | Rubin .......................... 342/26 R |
| 8,354,950 | B2 | * | 1/2013 | Kemkemian et al. ....... 342/26 R |
| 2001/0013839 | A1 | * | 8/2001 | Wurman et al. ............... 342/26 |
| 2002/0126039 | A1 | * | 9/2002 | Dalton et al. .................. 342/26 |

FOREIGN PATENT DOCUMENTS

| EP | 2 251 711 | 11/2010 |
| JP | 2005-189177 | 7/2005 |
| WO | 9505613 A1 | 2/1995 |

OTHER PUBLICATIONS

Finnish Search Report dated May 31, 2012, corresponding to the Priority Application No. 20116289.
Extended European Search Report, dated Apr. 29, 2013, from corresponding EP application.

* cited by examiner

*Primary Examiner* — John B Sotomayor
*Assistant Examiner* — Marcus Windrich
(74) *Attorney, Agent, or Firm* — Young & Thompson (57) ABSTRACT A method and an arrangement are provided for producing a computed distribution of speeds of scatterers in a target volume (1701). An estimate distribution of speeds at which scatterers would move in the target volume is provided (1201). It is converted (1202) to a candidate autocorrelation function that represent autocorrelation data points that a pulse radar would measure from the current estimate distribution. The fit of a candidate ACF to a measured ACF is measured (1203). The estimate distribution is accepted if a measured fit fulfills a predefined acceptance criterion, or modified (1205) in which case processing returns to the conversion of the modified estimate distribution to an ACF. An accepted estimate distribution is output (1206) as a computed distribution of speeds that describes the actual distribution of speeds.

14 Claims, 7 Drawing Sheets

METHOD AND IMPLEMENTATION FOR CALCULATING SPEED DISTRIBUTIONS WITH MULTI-PRI AND SMPRF RADARS

TECHNICAL FIELD

The invention concerns in general the technology of using radar to detect a distribution of speeds that occur within a target volume. Especially the invention concerns the technology of efficiently converting a measured radar signal into a result that reveals the speed distribution, through the application of signal processing methods.

BACKGROUND OF THE INVENTION

Doppler radars compare echoes from two pulses sent shortly after another, so that the comparison is usually based on a difference in phase. If the object reflecting the pulse moved by a distance smaller than a quarter the wavelength of the radar beam, the measurement reveals its radial speed relative to the radar antenna. For instance, if the radar transmission has a frequency of 5 GHz (wavelength 6 cm) and transmitted pulses follow each other at one millisecond intervals, the maximum distance traveled is 1.5 cm and the absolute value of the maximum detectable speed is 15 m/s. If the scattering object moved faster, the speed measurement will be wrong by a multiple of 30 m/s.

A weather radar differs from e.g. a traffic radar in that it will not measure the single speed of a single object but the distribution of speeds of scattering targets, also called just scatterers for short. In meteorological terms, the scatterers are radiation-scattering hydrometeors (solid particles and/or liquid droplets) within a volume of air. Depending on the resolution of the radar this so-called target volume can be very large, for instance one cubic kilometer. All scatterers within the target volume will not move at a uniform speed; for example a cloud will constantly change its shape. If there are several layers of clouds, they often move with different speeds into different directions. The weather radar typically measures several differently moving layers in the atmosphere simultaneously. The size of the target volume is defined by the dimensions (width) of the radar beam as well as the resolution in units of time that is used to process the radar measurements. Even if the radiation-scattering targets are actually solid particles and/or liquid droplets and not the gaseous constituents of air, it is conventional to say for example that the weather radar may measure "the movements of air" or "wind speed".

Figure 1:
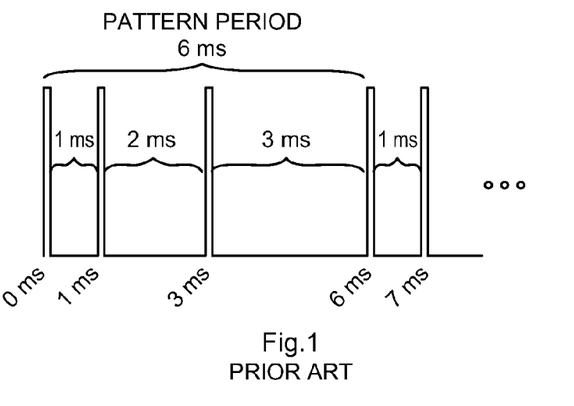
FIG. 1 illustrates a pulse pattern.

In the simplest case a radar emits pulses at a fixed frequency. If the radar is sending a single pulse every millisecond, its Pulse Repetition Frequency (PRF) is 1 kHz. A more sophisticated transmission scheme is Multi-PRI (Multiple Pulse Repetition Intervals), which uses a periodic pattern of pulses. An example is a period of 6 ms that involves sending pulses at 0 ms, 1 ms, and 3 ms. The pauses between pulses would be 1 ms, 2 ms and 3 ms, then starting over. FIG. 1 illustrates such a sample pattern of pulses. Simultaneous Multiple Pulse Repetition Frequency (SMPRF) is Multi-PRI which does not wait for the pulse to fade before sending the next pulse. As a result the SMPRF radar will receive echoes of multiple pulses at the same time.

An autocorrelation function, ACF for short, is a conventional way to explain and measure the remotely sensed movements of air. The ACF shows how the echo of a volume of air changes over time. It can be considered as an indicator of how a time-shifted copy of the received signal correlates with the original received signal. Values of the ACF are complex numbers. An ACF value equal to the real number "1" (with the imaginary part equal to zero) means simply that the echo did not change at all. Here we assume that the ACF values are scaled correspondingly: the general level of unscaled ACF values depends on the overall reflectivity of the target, i.e. on how much of the radar signal was reflected back.

Values of the ACF may be plotted as a function of the time shift between the compared signals. At time shift zero the properly scaled ACF will be always 1 (because any arbitrary signal correlates perfectly with its exact copy). If the echo changes, the absolute value of the ACF will decrease. An absolute value 0 of the ACF means no correlation or similarity at all. If the volume of air seems to be moving but stays otherwise the same, the ACF will "turn" in the complex plane.

The ACF does not say anything about the shape of the reflecting object or how the echo actually looks like. It explains the change. For instance, the radar echoes of a perfectly flat wall and a mountain will be entirely different. But since they both stand still they have the same ACF (of a constant 1).

Figure 2:
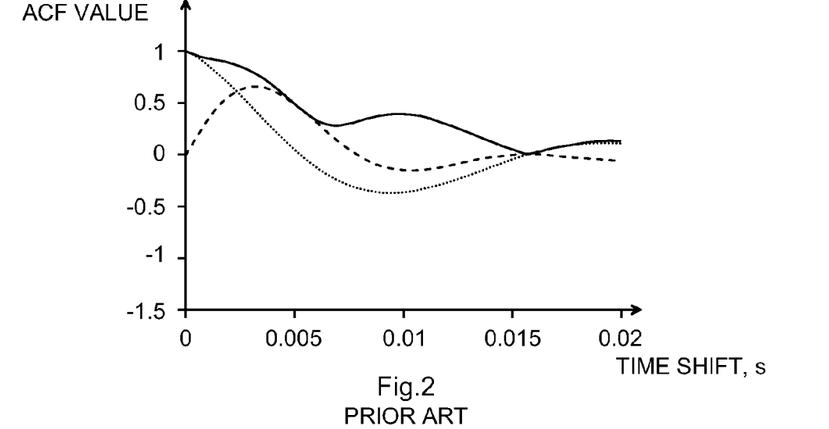
FIG. 2 illustrates the real and complex parts of a calculated autocorrelation function.
Figure 3:
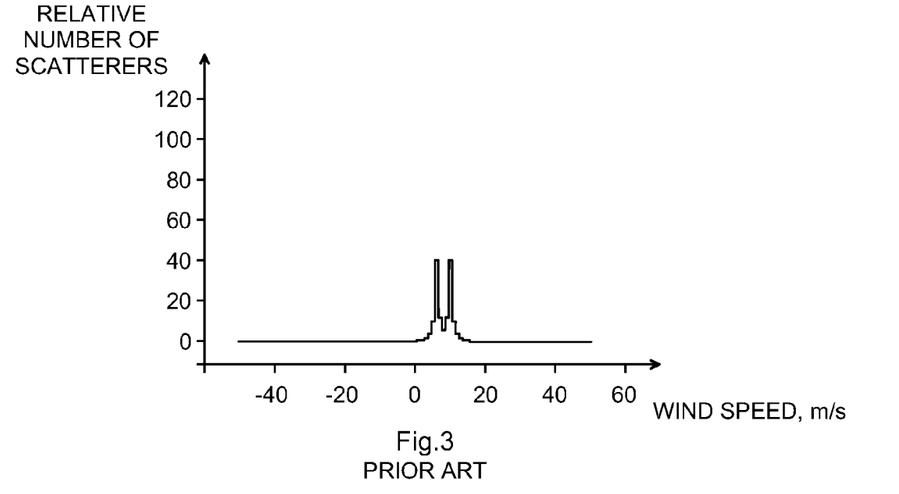
FIG. 3 illustrates a speed distribution.

If the speed distribution in the volume consists of more than one peak value, each with some spread around the peak, the ACF doesn't have to descend continuously. FIGS. 2 and 3 demonstrate an idealised weather condition with two layers of clouds moving at different speeds. In FIG. 2 the solid line illustrates the absolute value, the dotted line the real part, and the dashed line the imaginary part of the ACF. FIG. 3 shows the corresponding histogram of speeds with maxima at 6 m/s and 10 m/s. The choice of scale for the vertical axis will be explained in more detail later. For the moment it suffices to note that it has a certain association with the scaling of the ACF; the total "mass" (i.e. the sum of all non-zero values) in the histogram reflects the true, unscaled value of ACF's zero lag (supposing that the histogram doesn't have any error).

Figure 4:
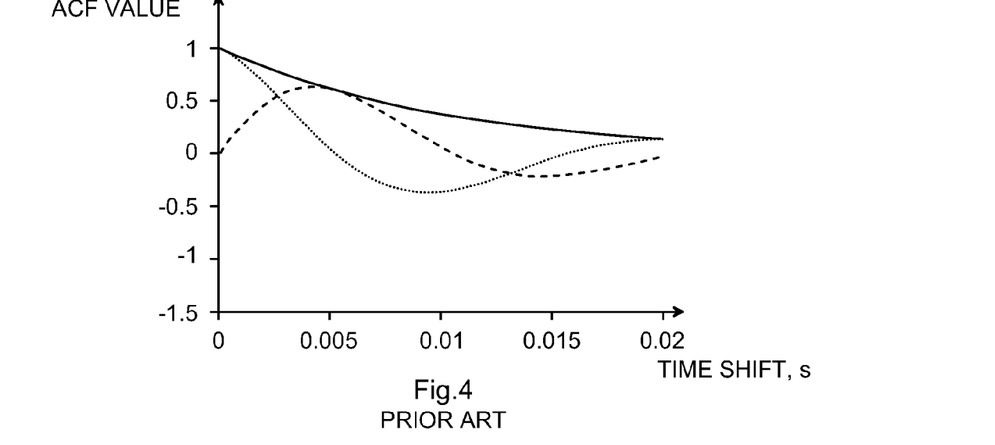
FIG. 4 illustrates the real and complex parts of another calculated autocorrelation function.
Figure 5:
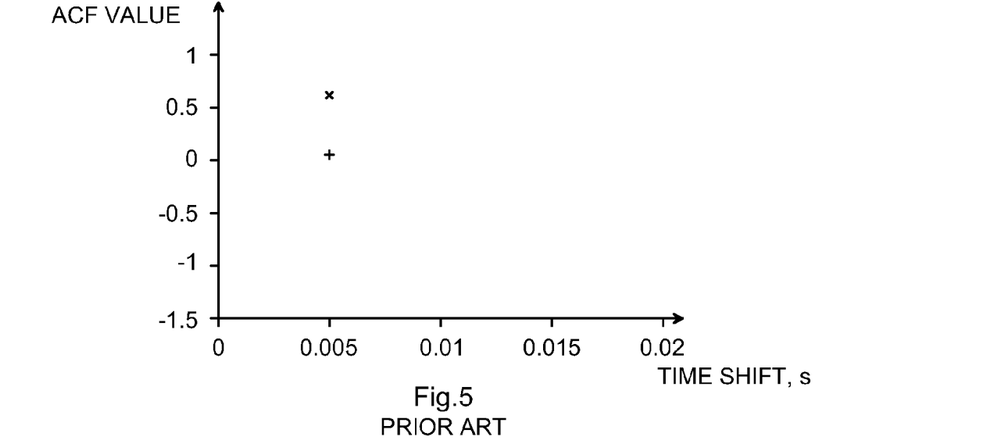
FIG. 5 illustrates data points of an autocorrelation function that could be measured with a Doppler radar.

An ACF illustrated with a smooth, continuous line like in FIG. 2 is a mathematical construction. A practical radar does not measure the entire function. A conventional Doppler radar, for example, may give just one meaningful complex number as an output. FIG. 4 shows the ACF of a model cloud over 0.02 seconds. The solid line is the absolute value of the ACF, the dotted line is the real part and the dashed line is the imaginary part. A conventional Doppler radar will measure only two data points, one at time shift zero and the other at 5 ms. FIG. 5 shows the real part of the measurement as a plus sign and the imaginary part as an x. The measurement at time shift zero is always equal to the real number 1, so it is not explicitly shown in the illustration. The output of the conventional Doppler radar does not enable the calculation of any speed distributions; it only gives the single most typical value. If an aeroplane or some other solid, efficient scatterer happened to appear in the radar beam, the whole attempt to measure wind speed is ruined.

Using Multi-PRI or SMPRF gives more information about the ACF: more data points are measured, and a reasonable ACF can be illustrated. As an example we may consider a pattern of 3 pulses, with the intervals between pulses being 1750 µs, 2000 µs, and 2500 µs respectively. The total period is 6250 µs. When comparing the echo of the first and second pulses, one gets a measurement for the change in the cloud during 1750 µs. When comparing the echo of the fourth and fifth pulses we get another one. And another one for the seventh and eighth, and so on. Adding them up (integrating) gives a statistical result for a "lag" of 1750 µs. Measurements for 2000 µs and 2500 µs combine in the same way respectively. Comparing the first echo with the third will result in a measurement for a lag of 3750 µs (1750+2000). Comparing the third and the fifth will result in a measurement for 4250 µs. Second and fourth gives 4500 µs. First and fourth give 6250

μs, and so on. This can be continued as long as desired, but very long lags make sense only if there is little turbulence.

Figure 6:
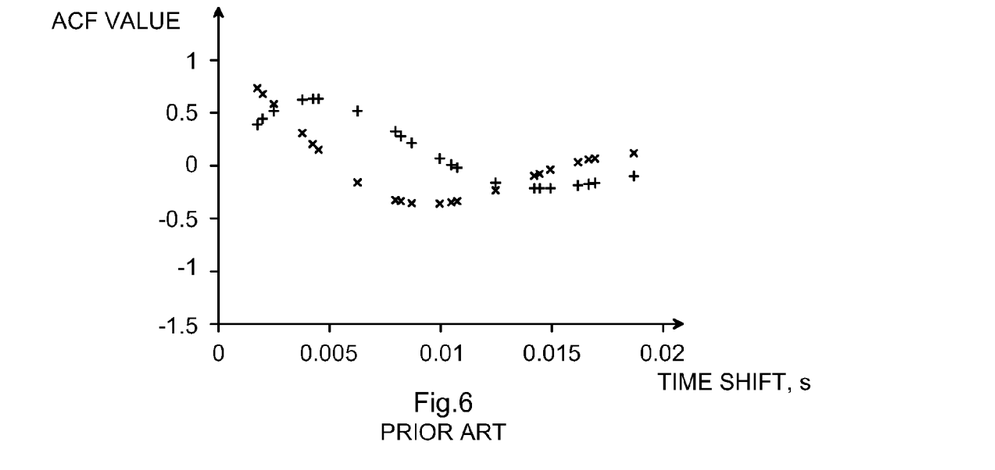
FIG. 6 illustrates data points of an autocorrelation function that could be measured with a Multi-PRI/SMPRF radar.

As a result, a number of data points are measured for the ACF. FIG. 6 shows 21 nontrivial data points (the trivial one being the one at time shift zero). The real part of the data points are shown as plus signs and the imaginary parts are shown as x signs.

Figure 7:
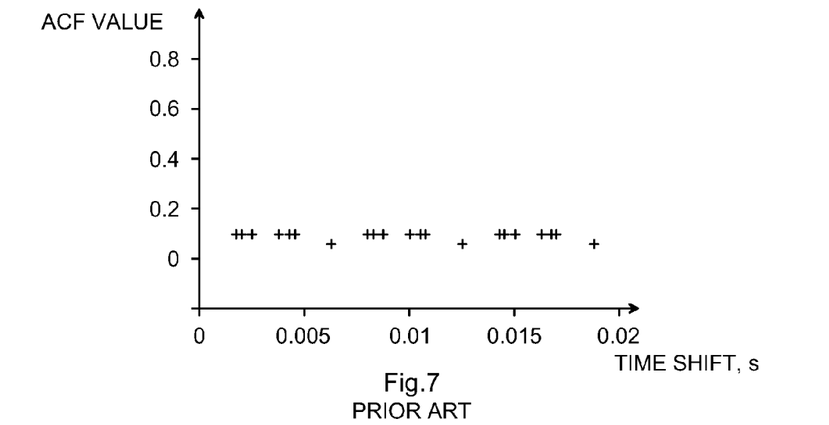
FIG. 7 illustrates data points of an autocorrelation function of noise.

Concerning noise, the ACF value at lag zero is again one after normalization. When calculating other lags for pure noise, the random phase of Multi-PRI and SMPRF pulses will result in a complex number of random phase and an absolute value of about one. The integration of the pulses will now add up complex numbers of random phase, resulting in a random walk. Assuming gaussian noise we can expect the absolute value of any lag to be the inverse of the square root of the number of elements added in the integration. For integration of 100 pulses, the ACF value at any lag is thus expected to be a complex number of absolute value of 0.1. Assuming the pulse sequence described above, the lags at 6250, 12500 and 18750 μs integrate three times the number of measurements, resulting in an absolute value of 0.06. FIG. 7 shows 21 data points of the expected absolute values. The absolute value at lag 0 is 1, but it is not explicitly shown in the illustration. The real and imaginary parts do not have an expected value and are not shown in the illustration.

Measured ACFs that look similar to the graph of FIG. 7 should be discarded and the measurement should be marked as pure noise. If individual points of a measured ACF have an absolute value comparable to noise, they can be ignored individually.

The drawbacks of prior art have been related to the relatively uncommon use of Multi-PRI and SMPRF elsewhere than in ionospheric research, as well as to the large requirements of computing capacity that has been needed to turn measured ACFs into meaningful indications of speed distribution.

SUMMARY OF THE INVENTION

According to an aspect of the present invention, a method and an implementation are provided that enable deriving a speed distribution from a measured autocorrelation function that has multiple data points. According to another aspect of the invention, a method and an implementation are provided that require only a modest amount of computing resources for deriving the speed distribution. According to yet another aspect of the invention, a method and an implementation are provided for producing displayable speed distribution results from a remote sensing radar, such as a weather radar, in real time.

These and further aspects of the invention are achieved by considering the autocorrelation function as the sum of component functions, each of which represents a constant speed within a limited range known as a speed bin. Numerical optimisation, most advantageously of the kind known as simulated annealing, is applied to the derivation of the speed distribution so that for an estimate distribution, a candidate ACF is composed of the component functions that represent the speed bins as they appear in the estimate distribution. The candidate ACF is compared with the measured ACF, and changes are repeatedly made in the estimate distribution in an educated way until a reasonably good agreement is found between the ACFs.

In order to make the calculation efficient, it is advantageous to use a fixed number of bits to represent the relative energy in each speed bin. When changes are made in the estimate distribution, this is most advantageously done by taking a predetermined number of bits from the value representing one speed bin and giving them to one or more other speed bins.

Vector arithmetics are most advantageously used for the calculations. For example an ACF of up to 24 complex data points can be stored in 6 vectors, each comprising 8 integers represented with 16 bits. Correspondingly 8 vectors store up to 32 complex data points. Since the ACF of an estimate distribution is considered as the combination of component functions, each representing a fixed-size part of the estimate distribution, calculating a new ACF for a changed distribution can be made simply by subtracting one component function and adding a new one.

The distribution itself is most advantageously also stored as an array of vectors. For example, if 8 bits of a 16-bit word are used for an index number of the speed bin and the remaining 8 bits for the currently valid energy value of that speed bin, a distribution with a grid of 256 speeds can be stored as an array of 32 vectors.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF EMBODIMENTS OF THE INVENTION

A. Defining Grids

For the purposes of this description, the expressions "speed distribution" and "distribution of speeds" mean the same thing, which is an indication of what are the relative magnitudes of different speeds at which scatterers move in a target volume. In practice, a speed distribution is a group of values, in which each value is associated with some sub-range or "bin" of speeds, and each value indicates, what is the relative number of scatterers the speeds of which fall within that bin. In the case of a weather radar, plotting the values of a speed distribution as a histogram gives a very intuitive illustration of what wind speeds were encountered, and in which relative quantities, in the target volume.

Figure 8:
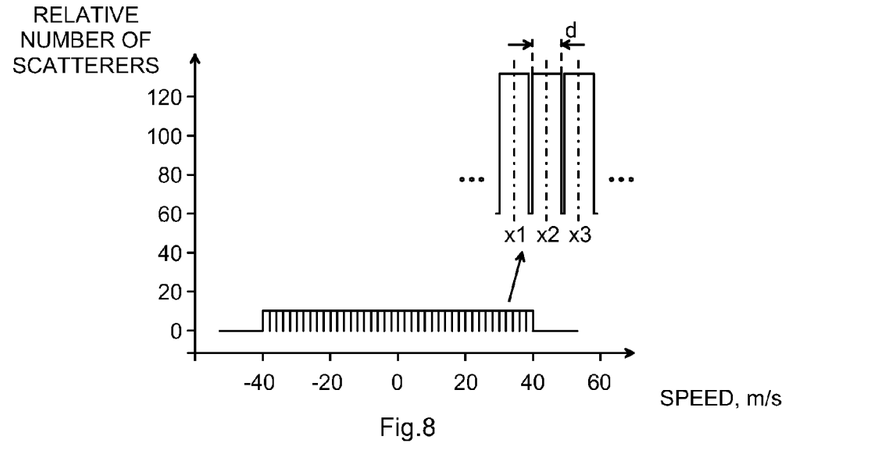
FIG. 8 illustrates an example of a grid.

Together a number of bins constitute a grid, and the mean distance between centre points of bins is the grid spacing. The invention allows considerable freedom in defining the grid. FIG. 8 illustrates an example in which each bin is centered at a bin-specific centre point, say x m/s, and represents—at equal importance—all speeds x±d/2 m/s, where d is the width of the bin. In the example of FIG. 8 the width of each bin is 2 m/s, so the whole range of speeds between −40 m/s and 40 m/s can be covered by announcing the values associated with the centre points −39 m/s, −37 m/s, . . . 37 m/s, 39 m/s of the bins. In the partial enlargement the adjacent bins are shown as slightly separated for graphical clarity, to enable discerning the graphical representations of the bins as adjacent vertical bars.

Figure 9:
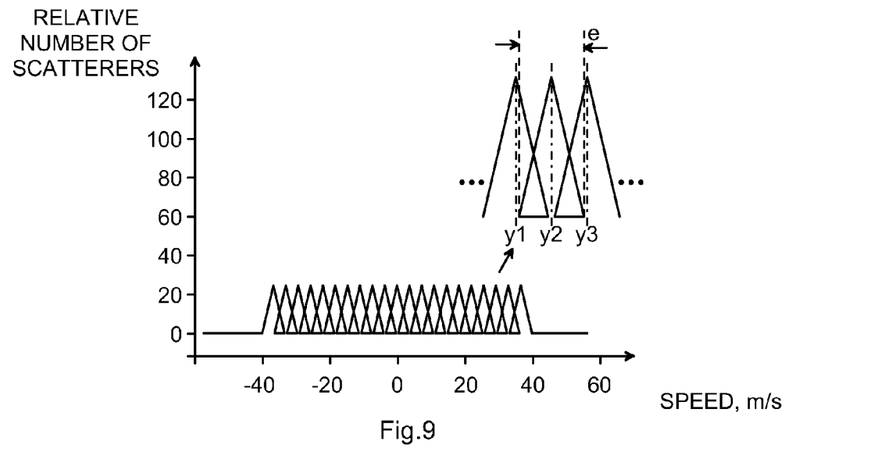
FIG. 9 illustrates an example of another grid.
Figure 10:
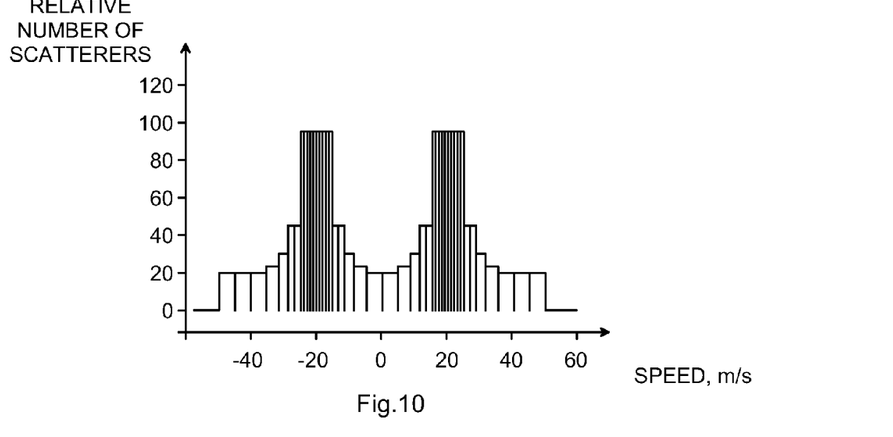
FIG. 10 illustrates an example yet another grid.

FIG. 9 illustrates an alternative way of defining a grid. Here each bin is again centered at a bin-specific centre point, say y m/s. The bins have triangular form so that each bin represents speeds y±e/2 m/s, where e is the width of the bin, but with the speeds close to the centre point heavily emphasized. Adjacent bins also overlap each other, which is perfectly possible for the purposes of the present invention. FIG. 10 illustrates an alternative, according to which it is not necessary to have the same width for each bin. In the example of FIG. 10 the speeds at or close to 20 m/s either towards or away from the radar antenna seem to be particularly interesting, because the grid spacing is tighter around ±20 m/s. In order to keep the relative "mass" represented by each bin constant, the narrower bins are illustrated in FIG. 10 as higher. All variations illustrated above, as well as other variations, can be freely combined when defining a grid.

A solid object moving at a speed of x m/s would give an ACF of the form $e^{i\omega t}$, where ω is a function of the speed x and the wavelength of the radar signal. When speed distributions rather than single-valued speeds are investigated and a grid with particular speed bins is used, the ACF corresponding to each individual speed bin can be calculated by integrating over the width of the speed bin. A properly made integration takes into account the form (rectangular, triangular etc.) of the bin.

B. Linearity and Component ACFs

The present invention takes considerable advantage of the linear nature of the transformation between measured speed distributions and the corresponding autocorrelation functions. For the purpose of illustration we may assume that there is an operator SD that transforms an ACF into a speed distribution: if acf is an ACF, the corresponding speed distribution is SD(acf). Similarly we may assume that there is an operator ACF that transforms a speed distribution into an ACF: if sd is a speed distribution, the corresponding ACF is ACF(sd). Linearity of the transformations means that SD(acf1+acf2)=SD(acf1)+SD(acf2)

and

ACF(sd1+$ad$2)=ACF(sd1)+ACF(sd2), where acf1 and acf2 are two ACFs and sd1 and sd2 are two speed distributions.

Figure 11:
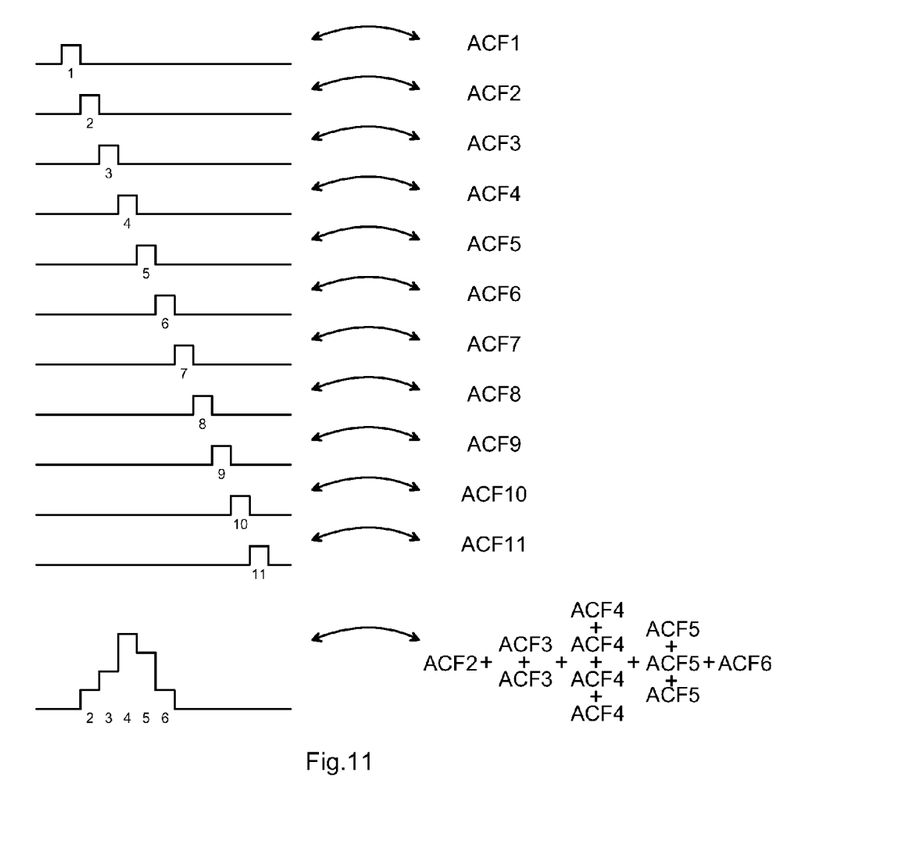
FIG. 11 illustrates the principle of constructing candidate ACFs from component ACFs.

FIG. 11 illustrates how the linear nature of the transformations can be utilized advantageously. First, we may conceptually imagine a number of elementary or component speed distributions. Each of them represents a normalized amount of measured power in one speed bin, or a constant "mass" of the magnitude one unit in one column of the histogram. The top left part of FIG. 11 illustrates schematically eleven such component speed distributions. Knowing the pulse pattern that will be used for a Multi-PRI/SMPRF radar measurement, it is possible to calculate a component ACF that would result if the target volume only contained a speed distribution equal to a particular component speed distribution. The top right part of FIG. 11 illustrates schematically the eleven component ACFs that correspond to the eleven component speed distributions. The calculated component ACFs consist of groups of complex numbers, and they can be stored in a memory. It should be noted that the image has been simplified for reasons of graphical clarity: for example, a typical speed distribution would have a lot more speed bins than just eleven.

The bottom part of FIG. 11 shows how an actual speed distribution can be converted to the corresponding candidate ACF in the case of FIG. 11. We note that the speed distribution on the left comprises one "unit" of speed in speed bin 2; two "units" of speed in bin 3; four "units" of speed in bin 4; three "units" of speed in bin 5; and one "unit" of speed in bin 6. Knowing the component ACFs, such a speed distribution can be converted to an ACF by summing the appropriate component ACFs. The integer value (i.e. the number of "units") associated with each speed bin indicates, how many times the corresponding component ACF is taken into the combination of component ACFs. For the purposes of the other parts of this description, we may assume that providing an estimate distribution of speeds involves giving a bin-specific integer value for each of a number of speed bins.

C. Finding the Speed Distribution Through Optimization

Figure 12:
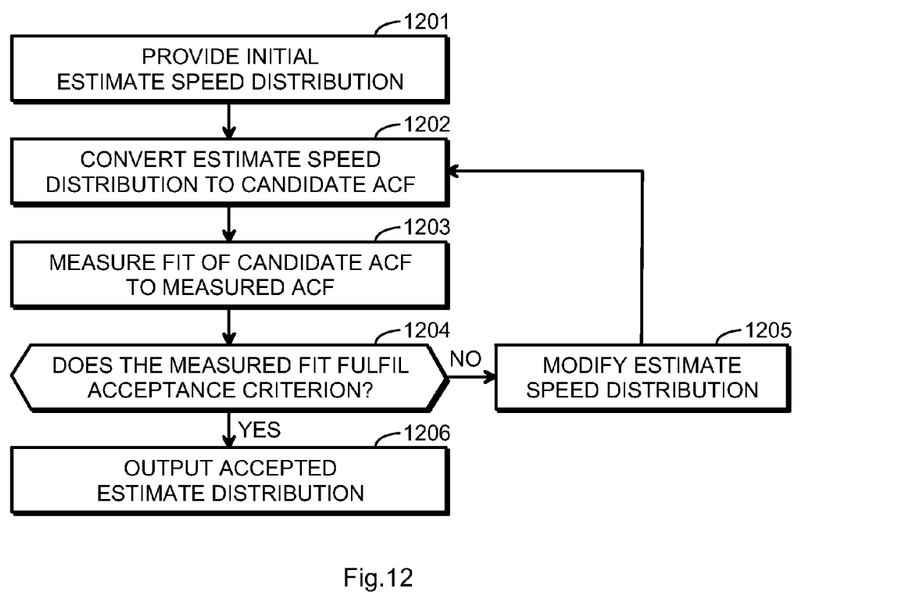
FIG. 12 illustrates a method and a computer program product for applying numerical optimisation to the finding of a correct estimate speed distribution.

FIG. 12 illustrates schematically a principle of applying numerical optimization to producing a computed distribution of speeds of scatterers in a target volume. At step 1201, there is provided an initial estimate distribution of speeds at which scatterers would move in the target volume. There are multiple ways of providing the initial estimate distribution, and these will be described in more detail later. For the time being it is sufficient to assume that the estimate distribution conforms to the principle that was explained above in association with FIG. 11: it is a combination of some component speed distributions, the corresponding component ACFs of which are known.

Step 1202 illustrates converting the estimate distribution to a candidate autocorrelation function. Again following the principle illustrated above in FIG. 11, the candidate ACF can be constructed as a sum of those component ACFs that correspond with the component speed distributions that served as the "building blocks" of the estimate distribution. When completed, the candidate ACF represents autocorrelation data points that a pulse radar would measure by remotely sensing the target volume, if the distribution of speeds of scatterers within the target volume would equal the estimate distribution that was provided in step 1201.

We assume that an actual radar measurement has been made; it resulted in a measured ACF that represents data points that the pulse radar measured by remotely sensing an actual target volume where actual scatterers had some actual distribution of speeds. Step 1203 involves measuring the fit of the candidate ACF to the measured ACF. In other words, by comparing the candidate ACF to the measured ACF, we indirectly investigate, how much the estimate distribution resembles the actual distribution of speeds that prevailed in the actual target volume.

Step 1204 represents making a decision that involves either accepting or not accepting the estimate distribution. An estimate distribution can be accepted if the fit measured at step 1203 fulfils a predetermined acceptance criterion. More detailed considerations about acceptance criteria will be made later. In general, accepting the estimate distribution means that step 1203 proved the currently valid candidate ACF to be sufficiently close to the measured ACF. If the estimate distribution is not accepted, there follows a transition to step 1205, in which the estimate distribution is modified, typically by making an educated guess about how the estimated distribution should be changed in order to make it resemble closer the actual distribution of speeds. After modifying the estimate distribution, processing returns to step 1202, where the modified estimate distribution is now used. The loop consisting of steps 1202, 1203, 1204, and 1205 is circulated until an accepting decision can be made at step 1204. It is advisable, though, to provide some kind of timeout, maximum number of modifying rounds, and/or other safety mechanism that terminates the circulation of the loop in case sufficient convergence of the candidate ACF towards the measured ACF will not take place.

Step 1206 illustrates outputting the eventually accepted estimate distribution as the result. It is a computed distribution of speeds that describes the actual distribution of speeds that occurred in the target volume.

D. Providing the Initial Estimate Distribution

Numerical optimization has the capability of making the calculations converge towards an acceptable solution even if the calculations initially began from a relatively distant starting point. Therefore it is a plausible possibility to provide the initial estimate distribution at step 1201 by simply taking a constant distribution across some range of speeds. For example in a weather radar the initial distribution could be as simple as a constant value from −10 m/s to +10 m/s, or a constant value between some limits that have been decided according to existing knowledge about a prevailing wind speed (wider distributions for higher prevailing wind speeds). Numerous other default estimate distributions can be presented. If even some rough base information is available, for example in the form of knowledge about the typical direction and speed of wind on some area, it can direct the way in which the default estimate distribution is selected.

Concerning weather radars and other mapping-type applications, there are typically produced a number of measurement results that describe distributions of speeds of scatterers in a number of target volumes. The maximum range of a weather radar may be hundreds of kilometers, the distance resolution may be in the order of a kilometer or less, and the angular resolution around the antenna may be from a few degrees down to a fraction of a degree. Measuring up to the maximum range all around the antenna covers tens of thousands of individual target volumes. It is possible to select every N:th target volume, where N is a positive integer, and first find the speed distributions for these selected target volumes by using a default estimate distribution. The estimate distributions for the other target volumes than said selected ones could then be provided by interpolation between accepted estimate distributions that were output for the selected target volumes.

It is possible, but in many cases not recommendable, to choose an exact copy of an accepted estimate distribution from a neighbouring target volume as the initial estimate distribution. The disadvantages of such a selection stem from the fact that noise in the measurements could then cause the processing in the subsequent target volume to converge upon exactly the same result. This creates artefacts in the calculated speed distributions, because what should actually represent noise in the speed distribution will not appear to be random but will form patterns, because the noise simply becomes copied from one volume to another. Many times a more recommendable alternative is to basically use an accepted estimate distribution of a neighbouring target volume, but to make some (even completely random) changes in it before taking it as the initial estimate distribution for the subsequent target volume.

E. Methods of Modifying the Estimate Distribution

Advantageous methods that can be used at step 1205 bear certain resemblance to a numerical optimization principle known as simulated annealing. The principle is commonly considered to mean making random (or nearly random) changes to a currently valid estimate, however so that the extent of changes is the larger the further away a comparison shows the estimate to be from an acceptable result. In the terminology of simulated annealing, the measured distance between a currently valid estimate and the acceptable result is called the temperature.

Previously it was pointed out that it is advantageous to represent an estimate speed distribution by giving an integer value for each of a number of speed bins. Integer values have the inherent advantage that their handling in a computer environment does not cause truncation errors. Previously it was also pointed out that the sum of all nonzero values in an actual speed distribution equals the true (unscaled) value of the ACF at lag zero, and that scaling is applied so that for the calculations, the value of the ACF at lag zero is real number one. In order to keep the scaling valid, it is advisable to make the changes to an estimate speed distribution so that the "total mass" in the histogram, i.e. the sum of all nonzero bin-specific integer values does not change. As a conclusion, modifying the estimate distribution at step 1205 preferably involves redistributing the integer values between speed bins but keeping the sum of the integer values constant.

According to the principle of simulated annealing, the changes that are made to the estimate speed distribution as a part of its modification at step 1205 involve a certain degree of randomness. Typically most of the attempted changes make the modified estimate speed distribution only worse; in other words, the fit of a candidate ACF associated with the modified estimate speed distribution to the measured ACF is not even as good as the fit of the ACF associated with the previous estimate speed distribution. Towards the end of the computation, when the estimated speed distribution has already converged close to the actual speed distribution, close to 100% of the attempted modifications result in a worse fit. According to an aspect of simulated annealing, it is advantageous to always accept modifications that result in a better fit, but to also accept modifications that result in a worse fit with a certain (although relatively low) probability. It is advantageous to apply certain rules that change said probability along the way, as will be described in more detail later.

Figure 13:
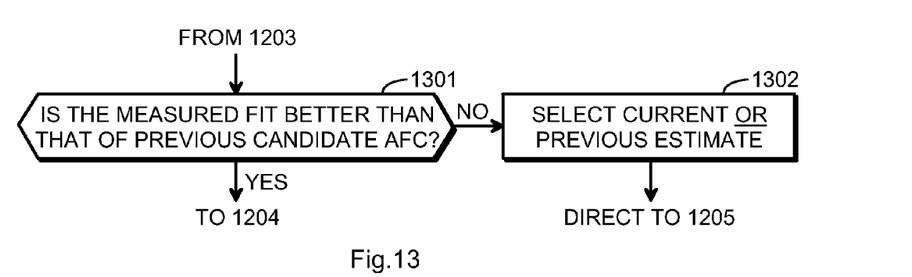
FIG. 13 illustrates a detail that can be applied in the method or computer program product of FIG. 12.

FIG. 13 illustrates schematically one possible way of doing a check of whether to accept the modification or not. According to step 1301, after measuring the fit of the current candidate ACF to the measured ACF, the fit is compared to the fit of the previous candidate ACF. If the current ACF seems to fit better, we may assume that the current estimate speed distribution is closer to the actual speed distribution in the target volume, and processing continues to step 1204 where it is examined, whether the fit is additionally good enough to end the whole processing. If a negative decision is then made at step 1204, it is in any case the current estimate speed distribution that will be used as a basis for modification in step 1205.

If the measured fit of the current candidate ACF is found worse than that of the previous candidate ACF in step 1301, the current estimate speed distribution is discarded and replaced with its predecessor most of the time. The aspect of simulated annealing mentioned above means that the current estimate speed distribution may, with a certain probability, still be selected as the basis for modification. Step 1302 represents selecting either the current or the previous estimate speed distribution as the basis for modification, depending on a predefined probability.

Figure 14:
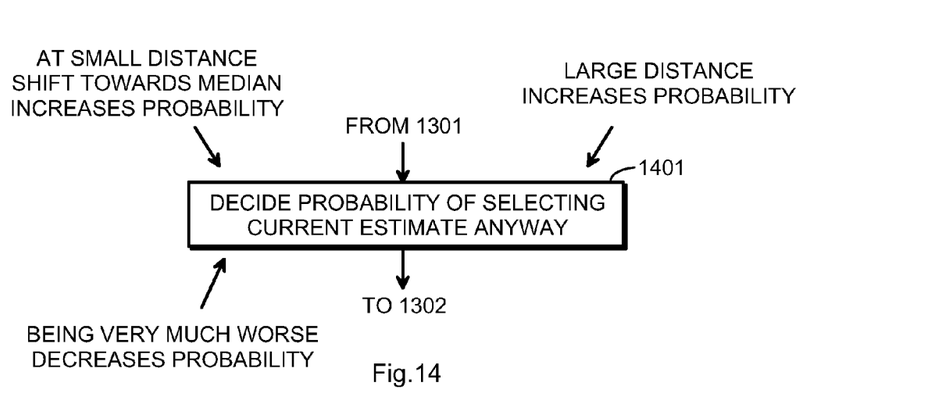
FIG. 14 illustrates another detail that can be applied in the method or computer program product of FIG. 12.

Deciding the probability is separately illustrated as step 1401 in FIG. 14. If, according to the parlance of simulated annealing, "temperature is still high" (meaning that the distance to finding an acceptable solution is still relatively large), the probability of using the current estimate speed distribution anyway as the basis for modification may be relatively high. This ensures sufficient freedom to make even quite radical changes in the beginning of the process. Another condition that may increase the probability is a finding, according to which the change in the estimate speed distribution that led to the present one involved making the distribution more concise, i.e. shifting "mass" in the histogram towards the median of the distribution rather than away from it. This principle follows experience, according to which actual speed distributions tend to exhibit concentrated peaks of adjacent speeds rather than wildly spread individual speed values. A factor that may decrease the probability of selecting a current estimate even if it was worse is the large extent to which it was worse.

The invention does not place limitations to the extent to which, if any, the factors illustrated in FIG. 14 affect the probability. According to one possibility, the probability is not affected at all by the extent to which the current estimate was found to be worse, so that only the temperature and the shift towards or away from the median have an effect. Another possibility is to turn off the possibility of accepting a worse fit altogether, meaning that the probability mentioned above is always zero. In this last-mentioned case the method actually loses an important characteristic of simulated annealing and becomes mere random optimization.

Figure 15:
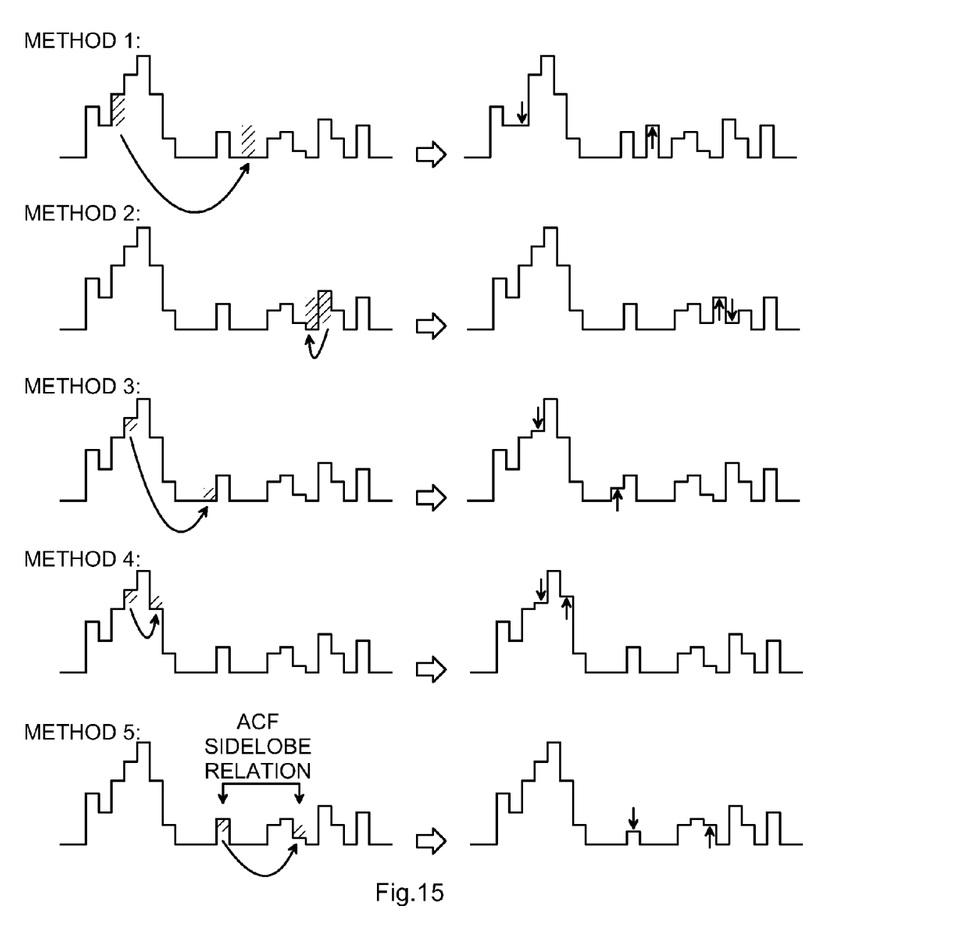
FIG. 15 illustrates certain ways of modifying an estimate speed distribution.

FIG. 15 illustrates schematically some possible ways of modifying the estimate speed distribution. The topmost alternative, labelled as method 1, involves picking first and second speed bins at random, reducing the integer value for the first speed bin, and increasing the integer value for the second speed bin by as much as was deducted from the first speed bin. The arrow shows, how a certain part of the "mass" in the histogram is shifted from its previous speed bin to a new, randomly selected speed bin. The next alternative, labelled as method 2, involves picking two adjacent speed bins: along the x-axis, i.e. within the range of speeds to be measured, the second speed bin is immediately adjacent to the first speed bin. Again the arrow illustrates reducing the integer value for the first speed bin and increasing the integer value for the second speed bin by as much as was deducted from the first speed bin.

The middle alternative, labelled as method 3, involves picking a first speed bin from among the N currently most highly valued speed bins, where N is a predetermined positive integer. In the example of FIG. 15 the picked first speed bin appears to be the second most highly valued speed bin, so we might assume that N was predetermined as e.g. 2, 3, 4, or 5 in this example. A second speed bin is picked at random. The integer value for one of these picked speed bins is reduced, and the integer value for the other picked speed bin is increased by as much as was deducted from the reduced speed bin. The example in FIG. 15 illustrates reducing the integer value for the first speed bin and increasing that of the second speed bin, but the roles of these bins could quite as well be reversed.

The second lowest alternative, labelled as method 4, resembles that of method 3 but with the difference that both the first and the second speed bin are now picked from among the N currently most highly valued speed bins, where N is again some predetermined positive integer. The integer value for the first speed bin is reduced, and the integer value for the second speed bin is increased by as much as was deducted from the first speed bin.

The lowest alternative, labelled as method 5 in FIG. 15, is based on the finding that ACFs typically include the so-called sidelobe phenomenon. Depending on the selected pulse pattern and other arrangement parameters, there may be at least one pair of speeds to that a scatterer moving at one of these speeds gives a measured ACF that is very much alike the measured ACF given by a scatterer that was moving at the other of said speeds. If such a pair of speeds is known, it is advantageous to select the grid spacing of the speed distribution so that a pair of speed bins coincides with said pair of speeds. We may say that these speed bins are related through a side lobe relationship between their corresponding ACF data points. The alternative labelled as method 5 in FIG. 15 involves picking first and second speed bins that are related through a side lobe relationship between their corresponding ACF data points, reducing the integer value for the first speed bin, and increasing the integer value for the second speed bin by as much as was deducted from the first speed bin. If one of the speed bins can be identified as the side lobe and the other as the main lobe, it is recommendable to do the shift from the side lobe bin to the main lobe bin.

Although all five methods illustrated in FIG. 15 involve exchanging "mass" in the histogram between exactly two speed bins, this is not a requirement or essential feature of the invention. Alternative methods can be presented that involve e.g. reducing the integer value for one speed bin, and distributing the free "mass" so obtained among a number of selected other speed bins, or simultaneously reducing the integer values for two or more speed bins and increasing the integer value for one selected speed bin by as much as was the total deduction from the other speed bins. For example when an initial estimate distribution is provided for a target volume by using the calculated result of a neighbouring target volume as a basis, it is possible to reduce the integer values for all speed bins by one, and distributing the free "mass" so obtained by random over the whole range between minimum and maximum speeds.

Which method is the most advantageous alternative each time for modifying the estimate speed distribution depends on the "temperature" in the simulated annealing process. At "very high temperature", i.e. when the measured distance between the candidate ACF and the measured ACF is very large, it is recommendable to allow relatively radical and even completely random changes in the estimate speed distribution. Thus method 1 is typically used, and the pieces of "mass" in the histogram that are moved are relatively large, like several percent of the total "mass" in the histogram. At somewhat lower but still relatively higher temperatures, methods 1 and 3 should be used. At medium temperatures, it is advantageous to use methods, 2, 3, 4, and 5, and to make the pieces of "mass" in the histogram that are moved the smaller the lower the temperature goes. At low temperatures, methods 2, 3, 4, and 5 can be used with small pieces of "mass" moved, and favouring shifts towards the median of the current speed distribution.

F. Performance Enhancements

Earlier it was pointed out how a candidate ACF that corresponds to an estimate speed distribution of the integer-valued histogram type can be constructed modularly by summing together as many speed-bin-specific component ACFs as the integer value for each speed bin indicates. This modular property of the ACFs can be utilized to significantly quicken the procedure of converting a modified estimate speed distribution to its corresponding ACF.

Figure 16:
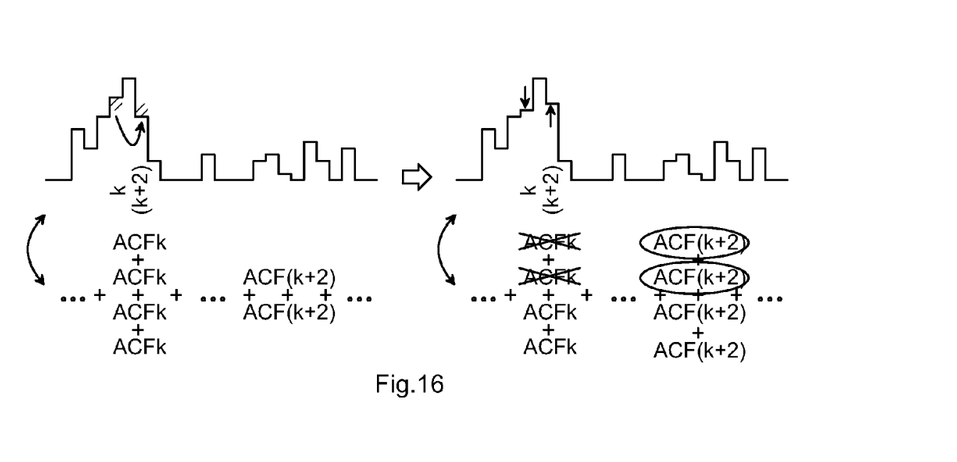
FIG. 16 illustrates how a modification of an estimate speed distribution can be accounted for in converting it to a candidate ACF.

FIG. 16 shows an example, in which method 4 is used for modifying the estimate speed distribution. We assume that the integer value for the k:th speed bin is reduced by two, and correspondingly the integer value for the (k+2):th speed bin is increased by two. The modified estimate speed distribution on the right in FIG. 16 can be easily converted to its corresponding candidate ACF by:

taking the previous candidate as the basis, deducting from the previous candidate ACF two times the component ACF illustrated as ACFk, corresponding to a reduction by two of the integer value for the k:th speed bin, and adding two times the component ACF illustrated as ACF (k+2), corresponding to the increase by two of the integer value for the (k+2):th speed bin.

Another way in which processing performance can be enhanced involves possibly rearranging the table of digital data that represents the current estimate speed distribution. A simple and effective digital representation of an integer-valued histogram consists of a number of value pairs (b, i), where b is the ordinal number of the bin and i is the integer value for that bin. For a human operator, the most intuitive storing and handling order of such value pairs is in an increasing order of the values b. Indeed the value pairs can be stored in such order at least when it is expected that the next round of modifying the estimate speed distribution will involve e.g. accessing adjacent speed bins, accessing speed bins that are related through a side lobe relationship between their corresponding ACF data points, or otherwise handling the integer values with explicit reference to their location within the range of speeds to be measured. As an example, if the grid spacing of the speed distribution is 1 m/s, and one should start from a particular b:th speed bin and access a speed bin representing a speed 10 m/s higher, it is easily done by taking the (b+10):th speed bin.

However, for other cases, different storing orders can be more preferable. For example, if the next round of modifying the estimate speed distribution will involve operations among the N most highly valued speed bins, it could be recommendable to rearrange the digital data and store the value pairs in an increasing or decreasing order of the values i. Or at least one could do partial rearranging so that the value pairs representing the N most highly valued speed bins are moved to one end of the table where the value pairs are stored. As an example, N could be one fourth of the total number of speed bins.

For operations that involve favouring shifts towards the median of the distribution, it is essentially obligatory to have the estimate speed distribution arranged by speed, i.e. in an increasing or decreasing order of the values b. The median of the distribution is then found easily by beginning at one end of the distribution, accumulating a total sum of the integer values for the speed bins, and stopping when one half of the known constant "mass" of the histogram has been reached.

G. Measuring the Fit of a Candidate ACF

The estimate ACF and the measured ACF are both most easily represented as vectors that have as many complex-valued elements as there are data points in the ACF. Thus measuring the fit of a candidate ACF to the measured ACF at step 1203 of FIG. 12 is most easily done by calculating the absolute value of a vector difference between the two. If variance data or other indications about the relative reliability of different data points in the measured ACF are available, weighting could be applied in calculating the vector difference so that those data points that are known to be the most reliable in the measured ACF have most significance in calculating the vector difference.

The absolute value of a vector difference is a real number, and a storage location must be reserved for it in the apparatus that performs the calculations. As the simulated annealing proceeds, it is presumable that the distance will progressively decrease from very large values to very small values. If the same storage location should be able to store both a very large value (up to the maximum possible magnitude) and a very small value (at the accuracy required to discriminate between the distances that will be encountered at low temperatures), the required storage location could end up reserving an impractically large number of bytes, and/or call for using floating point arithmetics. In order to save bytes and to enable performing this calculation with integer arithmetics, it is recommendable to calculate the vector distance between the candidate ACF and the measured ACF so that each component of the difference vector is divided by a parameter, the value of which is proportional to the prevailing "temperature" of the simulated annealing process.

Special cases to which particular attention can be paid in calculating the distance are signals reflected from other objects than the scatterers, the speed distribution of which is of interest. Taking again a weather radar as an example, the scatterers of interest are the solid particles and/or liquid droplets that are suspended in the air, while for example the ground, fixed obstacles, aeroplanes, flocks of birds, and wind turbine blades should be neglected.

The ground and fixed obstacles obviously appear in the speed distribution at speed zero. Their effect can be minimized for example by always replacing the integer value for the bin that represents zero speed with a calculated replacement value. It can be obtained for example through interpolation between the integer values for the bins adjacent to the zero-speed bin.

If the grid spacing is tight enough, aeroplanes and other moving solid objects should become visible as sudden, high peaks in the speed distribution. These can be corrected by applying the same strategy as with the zero-speed bin: every time a sudden high peak is encountered in a distribution, it can be replaced with an interpolated value.

Noise will give rise to ACF values of a specific, relatively small magnitude, as was illustrated above in association with FIG. 7. Noise can be accounted for in the process of measuring the fit of the candidate ACF to the measured ACF: for example when calculating the vector difference, one might ignore those vector components for which the value in the measured ACF is only of the order of magnitude that is known to correspond to noise.

Noise can also be accounted for in another way. It is possible that for some target volumes, the received signal will actually contain only noise. It would be advantageous if such noise-contaminated target volumes could be identified. During the process of producing a computed distribution of speeds of scatterers, one could always have a "pure noise distribution" as one possible estimate speed distribution, to which there would correspond a candidate ACF that only indicates the presence of noise. If that candidate ACF is found to provide the best fit to the measured ACF, one may label the corresponding target volume as not giving any useful measured signal but only noise.

Yet another way to take noise into account is to have one extremely wide speed bin in the estimate distribution that overlaps with a significant number of all other speed bins and which thus models noise.

The relative significance of noise in a measurement is partially revealed by the true (unscaled) value of the measured ACF at zero lag. A low value suggests that there is a relatively high proportion of noise in the measurement.

H. Using the Instruction Sets of a Processor

The handling of speed distributions and ACFs can be made very efficient by adapting their digital representation to data types that have been defined for a processor, and by utilizing an instruction set that parallelizes their processing. If each ACF is stored as a number of vectors in a number of vector registers, and each estimate speed distribution is also stored as a number of vectors, the modification of an estimate distribution and the conversion of estimate distributions to candidate ACFs (i.e. the adding and subtracting of component ACFs) can be performed as vector arithmetic operations that are defined in an arithmetic subsystem of the processor.

For example, in the Intel SSE series of instruction sets, a data type called _m128i has been available since the version SSE2. The data type is a vector of 8 integers, each having 16 bits. For embodiments of the present invention, operations may use signed or unsigned 16-bit integers. A newer instruction set called the AVX has been introduced in 2011, but for the purposes of simple integer operations it does not offer more functionality. The invention is not limited to the use of any particular instruction set, and it is advisable to have the processing code compiled for the newest instruction set that is available each time.

One ACF of up to 24 complex data points can be stored in 6 vectors of the _m128i type. If there are 32 complex data points, 8 vectors are needed. If an SSE instruction set is used, it is not advisable to use more data points than that, because the processors typically have a total of 16 vector register names, and several vector registers are needed for the recalculation of the ACFs. Keeping the number of ACF data points relatively low enables significant efficiency of processing, if both storing the ACFs and their recalculating can be effectively accomplished utilizing the registers of the processor instead of resorting to external memory.

The digital representation of a speed distribution must be defined so that the number of bits that are available for each bin-specific integer value is large enough to accommodate even the highest possible integer value that can occur in practice. For example, if we assume that the constant total "mass" in the histogram is 256 units, it is possible that one speed bin in a histogram will have more than half of the mass (i.e. more than 128 units) concentrated therein. In such a case there should be 8 bits reserved for the bin-specific integer value. The bin identifier, or the index number of the speed bin, should naturally have a sufficient number of bits to unambiguously identify all speed bins in the distribution. If eight bits are reserved for the bin identifier, the maximum number of bins is 256. With 16 bits thus reserved for each speed bin, a speed distribution of 256 speed bins can be stored as an array of 32 vectors of the _m128i type. Finding the median of a speed distribution should then start from one end of the distribution (arranged in original order, i.e. according to speed) and accumulate the bit values of speed bins until the accumulating sum reaches 128 bits.

It is advantageous to select the resolution in representing the speed distribution equal to the "unit mass" in the histogram that corresponds to the concept of a component ACF that was described in FIG. 11. Finer resolution in representing speeds would not be of any further advantage, because it is the candidate ACF, not the estimate speed distribution, that eventually determines, whether the calculation has proceeded close enough to the measured speed distribution in the actual target volume. The candidate ACF in turn can only be constructed at the accuracy of plus or minus one component ACF. Thus we may say that each component ACF corresponds with one bit of speed in a particular column of the histogram.

It is possible to construct a tailor-made processing arrangement for handling the estimate speed distributions and the candidate ACFs, for example using an FPGA (Field-Programmable Gate Array) as a basis. In an FPGA implementation, the processing can be parallelized by making the FPGA comprise at least as many computation units as there are data points in the ACF. Adding or subtracting one component ACF can then be efficiently accomplished by feeding the current candidate ACF and the component ACF to be added or subtracted into the parallel computation units, so that the result (the candidate ACF to which the component ACF is added or from which the component ACF is subtracted) is obtained in a single calculation step executed in parallel for all data points. Component ACFs can be stored in the form of lookup tables on the FPGA for easy and fast access.

Figure 17:
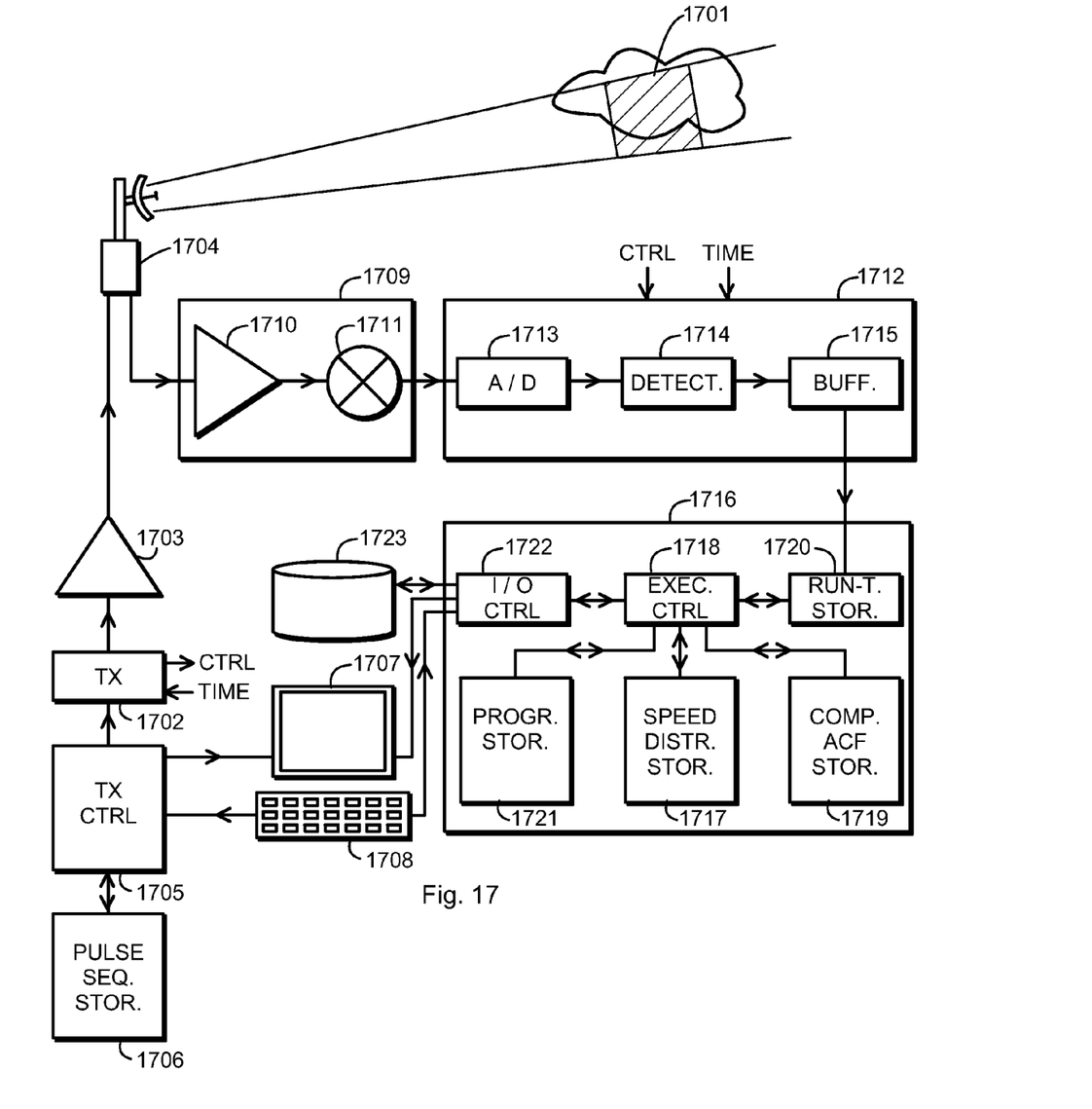
FIG. 17 illustrates a system that comprises an arrangement according to an embodiment of the invention.

FIG. 17 illustrates schematically a system, a part of which is an arrangement for producing computed distributions of speeds of scatterers in a target volume according to an embodiment of the invention. The system of FIG. 17 is a radar system, the task of which is to produce reliable indications of the speeds of scatterers, especially solid particles and/or liquid droplets, in a target volume 1701. It should be emphasized, however, that the present invention is not limited to only weather radars but is equally applicable to all remote sensing instruments of speed distributions, as long as the instrument produces an ACF that consists of multiple data points and exhibits the required linear nature of the conversion between ACFs and speed distributions.

The radar transmission is formed in a transmitter section 1702 and amplified in a transmission amplifier 1703 before being transmitted by an antenna 1704. The transmitter section 1702 operates under the control of a transmission controller 1705, one task of which is to select the appropriate pulse sequence from a pulse sequence storage 1706 for transmission. User interface devices are provided for enabling a human user to affect the operation of the transmission side; as examples, a display 1707 and a keyboard or keypad 1708 are shown.

Received signals are directed from the antenna 1704 to an analog reception processing section 1709, which is in FIG. 17 shown to comprise a preamplifier 1710 and a downconverter 1711. The downconverted received signal is forwarded to a digital reception processing section 1712, which in the example of FIG. 17 comprises an analog to digital converter 1713, a detector section 1714, and a buffer memory 1715. The task of the detector section 1714 is to produce the ACF representation of the received signal, which in the description above has been called the measured ACF. Up to storing the ACF representation in the buffer memory 1715 the system of FIG. 17 can follow the guidelines known from prior art pulse radar systems.

The arrangement 1716 comprises a distribution storage 1717 that is configured to store an estimate distribution of speeds at which scatterers would move in the target volume 1701. As was described above, from the viewpoint of efficient processing it is advantageous to have the estimate distribution stored in the form of a number of vectors, because that facilitates modifying the estimate distribution through the use of vector arithmetic operations. The arrangement comprises also an autocorrelation function calculator that is configured to convert estimate distributions to candidate autocorrelation functions that represent autocorrelation data points that the pulse radar system would measure by remotely sensing the target volume 1701 if the distribution of speeds of scatterers within the target volume would equal a current estimate distribution. In the illustration of FIG. 17, the autocorrelation function calculator comprises parts of the execution controller 1718, the component ACF storage 1719, and the run-time storage 1720.

From the viewpoint of efficient processing it is advantageous to have the run-time storage 1720 comprise a number of registers that are configured to store at least one candidate ACF in the form of a group of vectors. Registers are typically accessible in a processor directly through their unambiguous register names. This together with the possibility of applying vector arithmetic operations make the processing of ACFs very fast and efficient. Utilising the principle of constructing the candidate ACFs from component ACFs, it is advantageous to configure the autocorrelation function calculator to convert a modified estimate distribution to a candidate ACF by deducting from a previous candidate ACF a first component ACF, corresponding to a reduction of an integer value for a first speed bin in said estimate distribution, and by adding a second component ACF, corresponding to an increase of an integer value for a second speed bin.

Together with the run-time storage 1720, the execution controller 1718 constitutes also a measuring unit that is configured to measure the fit of a candidate ACF to a measured ACF that comprises data points that a pulse radar measured by remotely sensing an actual target volume where actual scatterers had an actual distribution of speeds. Further, the execution controller 1718 also implements a decision maker that is configured to make decisions about accepting or not accepting estimate distributions. The decisions involve accepting the estimate distribution if a measured fit fulfils a predefined acceptance criterion, or modifying a current estimate distribution, and returning processing to the conversion of the modified estimate distribution to an ACF. In order to make the execution controller 1718 implement the required functionalities, it is advisable to have in the arrangement 1716 a program storage 1721, in which machine-readable instructions are stored that, when executed by a processor or other kind of execution controller, make it to implement a method according to an embodiment of the invention.

The arrangement 1716 also comprises an output part, here an I/O (input/output) controller 1722, that is configured to output an accepted estimate distribution as a computed distribution of speeds that describes said actual distribution of speeds in the target volume 1701. Typically the output part is configured to combine the accepted estimate distributions of a number of target volumes, for example so that the output given to a user or stored in a mass storage 1723 describes the measured speed distributions within a wide area around the antenna 1704. In FIG. 17 the I/O controller 1722 is shown to have connections to the same user interface devices that are also used for controlling the transmissions. However, this is not a requirement of the invention; the processing, storing, and displaying of measurement results can be made completely separately from the control of the transmission side.

The advances in processing efficiency that can be accomplished through applying the present invention are significant. As an example, it has been found that with a 5 GHz weather radar that has an antenna beam width of 1 degree that turns at 5 degrees per second, and with a pattern of three pulses and pulse intervals in the magnitude of e.g. 1750 µs, 2000 µs, and 2500 µs, the wind speed distributions in 100.000 target volumes can be calculated in real time by using only a regular personal computer of the kind known at the time of writing this description. Previously a similar task could only have been realised with a supercomputer.

I. Possible Areas of Application

The invention brings the possibility of measuring speed distributions within reach of devices that by their size, manufacturing cost, and ease of operation are of the level required of mass-produced consumer devices. This opens up significant possibilities for employing remote sensing functionalities in applications where none have been known so far. As an example, traffic radars could measure the distributions of speeds of vehicles moving in an area, rather than just pinpointing single speed values of individual vehicles. The collective movements of large crowds of people can be monitored in real time for e.g. security purposes.

The observation of clouds has been already considered above, but also other areas exist where measuring the speed distributions of populations of airborne or spaceborne particles can be observed. For example, one may apply the invention to observe the airflow around the wings of an aeroplane, in order to detect and warn about anomalies. Space debris and asteroids can be monitored with a remote sensing instrument according to an embodiment of the invention, and the flow of particle-laden gases can be observed in chimneys or other kinds of flow channels. Swarms of flying birds or insects can be observed.

The surrounding medium does not need to be gaseous, if the remote sensing signal used for the measurement is of the kind that propagates in a liquid. Shoals of fish could be detected and monitored with an echo sounder, which uses acoustic waves as the remote sensing signal instead of electromagnetic ones. The flow of a scatterer-containing liquid can be observed; it typically contains a range of flow speeds across the diameter of a pipe, a blood vessel, or other flowing channel. Even the distribution of speeds in the output stream of a water gun or other liquid-ejecting apparatus can be measured.

In automotive applications a distance warning radar could pick up a lorry overtaking a small car, with the lorry giving a much higher signal. When parking, the relative speed of the measured object (e.g. tree) can be compared with the known car speed, and signals indicating different speeds can be filtered out.

The scatterers do not need to be individual objects, but also parts of the same objects can act as scatterers that move at different speeds. For example, measuring the speed distribution of the moving surface of a loudspeaker may give important information about potential anomalies. If a rotating object is measured, the result will be a distribution of speeds from different portions of the object depending on their relative distance from the rotation axis, and the measurement could used to e.g. reveal unwanted vibrations or deformations in the blades of a wind turbine.

Other possible applications of embodiments of the invention are possible within the scope of protection defined by the appended claims.

We claim:

1. A method for producing a computed distribution of speeds of scatterers in a target volume, the method being run on a processor, comprising:
   a) providing an estimate distribution of speeds at which scatterers would move in said target volume,
   b) converting said estimate distribution to a candidate autocorrelation function, hereinafter candidate ACF, that represents autocorrelation data points that a pulse radar would measure by remotely sensing said target volume if the distribution of speeds of scatterers within the target volume would equal said estimate distribution,
   c) measuring the fit of said candidate ACF to a measured ACF that comprises data points that a pulse radar measured by remotely sensing an actual target volume where actual scatterers had an actual distribution of speeds,
   d) making a decision that involves
   d1) accepting the estimate distribution if the fit measured at c) fulfils a predefined acceptance criterion, or
   d2) modifying the estimate distribution, and repeating steps b) to d) until the decision at step d) involves d1), and
   e) outputting the accepted estimate distribution as a computed distribution of speeds that describes said actual distribution of speeds.

2. The method according to claim 1, comprising:
   after measuring the fit of said candidate ACF to the measured ACF, comparing the measured fit to the measured fit of a previous candidate ACF to the measured ACF,
   if the measured fit of the current candidate ACF is better, continuing to d), and
   if the measured fit of the current candidate ACF is worse, continuing to d2) while using either the current or the previous estimate speed distribution as the basis for modifying, depending on a predefined probability.

3. The method according to claim 1, wherein:
   providing said estimate distribution involves giving an integer value for each of a number of speed bins, and
   converting said estimate distribution to said candidate ACF involves combining a number of component ACFs, so that for each speed bin, the integer value given for that speed bin indicates how many times a component ACF is taken into the combination of component ACFs.

4. The method according to claim 3, wherein:
   after modifying the estimate distribution, the step of converting the modified estimate distribution to a candidate ACF comprises deducting from the previous candidate ACF a first component ACF, corresponding to a reduction of the integer value for a first speed bin, and adding a second component ACF, corresponding to an increase of the integer value for a second speed bin.

5. The method according to claim 3, wherein:
   modifying the estimate distribution involves redistributing the integer values between speed bins but keeping the sum of the integer values constant.

6. The method according to claim 5, wherein redistributing the integer values comprises at least one of the following:
   picking first and second speed bins at random, reducing the integer value for the first speed bin, and increasing the integer value for the second speed bin by as much as was deducted from the first speed bin,
   picking a first speed bin and a second speed bin that within the range of speeds to be measured is immediately adjacent to the first speed bin, reducing the integer value for the first speed bin, and increasing the integer value for the second speed bin by as much as was deducted from the first speed bin,
   picking a first speed bin from among the N currently most highly valued speed bins, where N is a predetermined positive integer, picking a second speed bin at random, reducing the integer value for one of the picked speed bins, and increasing the integer value for the other picked speed bin by as much as was deducted from the reduced speed bin,
   picking first and second speed bins from among the N currently most highly valued speed bins, where N is a predetermined positive integer, reducing the integer value for the first speed bin, and increasing the integer value for the second speed bin by as much as was deducted from the first speed bin, and
   picking first and second speed bins that are related through a side lobe relationship between their corresponding ACF data points, reducing the integer value for the first speed bin, and increasing the integer value for the second speed bin by as much as was deducted from the first speed bin.

7. The method according to claim 1, which for producing a number of measurement results that describe distributions of speeds of scatterers in a number of target volumes comprises:
   selecting every N:th target volume, where N is a positive integer,
   for each selected target volume, performing the method by initially using a default estimate distribution, and
   providing the estimate distributions for the other than said selected target volumes by interpolation between accepted estimate distributions output for said selected target volumes.

8. The method according to claim 1, wherein said predefined acceptance criterion involves a requirement that a vector distance between the current candidate ACF and the measured ACF is smaller than a predefined limit.

9. The method according to claim 8, wherein for calculating the vector distance, data point values of the candidate and measured ACFs are weighted according to a known variance of the measured ACF.

10. The method according to claim 8, wherein for calculating the vector distance, data point values of the candidate and measured ACFs are ignored if their absolute values are equal to or smaller than a noise limit.

11. The method according to claim 1, wherein:
    each ACF is stored as a number of vectors in a number of vector registers,
    each estimate distribution is stored as a number of vectors, and
    the modification of an estimate distribution and the conversion of estimate distributions to candidate ACFs are performed as vector arithmetic operations.

12. An arrangement for producing a computed distribution of speeds of scatterers in a target volume, comprising:
    a distribution storage configured to store an estimate distribution of speeds at which scatterers would move in said target volume,
    an autocorrelation function calculator configured to convert estimate distributions to candidate autocorrelation functions, hereinafter candidate ACFs, that represent autocorrelation data points that a pulse radar would measure by remotely sensing said target volume if the distribution of speeds of scatterers within the target volume would equal a current estimate distribution, a measuring unit configured to measure the fit of a candidate ACF to a measured ACF that comprises data points that a pulse radar measured by remotely sensing an actual target volume where actual scatterers had an actual distribution of speeds, a decision maker configured to make a decision that involves accepting the estimate distribution if a measured fit fulfils a predefined acceptance criterion, or modifying a current estimate distribution, and returning processing to the conversion of the modified estimate distribution to an ACF, and an output part configured to output an accepted estimate distribution as a computed distribution of speeds that describes said actual distribution of speeds.

13. The arrangement according to claim 12, wherein:

the arrangement comprises a number of registers configured to store at least one candidate ACF in the form of a group of vectors, the autocorrelation function calculator is configured to convert a modified estimate distribution to a candidate ACF by deducting from a previous candidate ACF a first component ACF, corresponding to a reduction of an integer value for a first speed bin in said estimate distribution, and by adding a second component ACF, corresponding to an increase of an integer value for a second speed bin, and the autocorrelation function calculator is configured to perform said deduction and adding of component ACFs as vector arithmetic operations in said registers.

14. A computer program product comprising machine-readable instructions that, when executed on a processor, make the processor to produce a computed distribution of speeds of scatterers in a target volume, through:

a) providing an estimate distribution of speeds at which scatterers would move in said target volume, b) converting said estimate distribution to a candidate autocorrelation function, hereinafter candidate ACF, that represents autocorrelation data points that a pulse radar would measure by remotely sensing said target volume if the distribution of speeds of scatterers within the target volume would equal said estimate distribution, c) measuring the fit of said candidate ACF to a measured ACF that comprises data points that a pulse radar measured by remotely sensing an actual target volume where actual scatterers had an actual distribution of speeds, d) making a decision that involves d1) accepting the estimate distribution if the fit measured at c) fulfils a predefined acceptance criterion, or d2) modifying the estimate distribution, and repeating steps b) to d) until the decision at step d) involves d1), and e) outputting the accepted estimate distribution as a computed distribution of speeds that describes said actual distribution of speeds.

* * * * *